Figure 7:
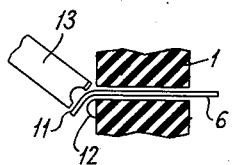

Aug. 24, 1937.  A. KAUFFELDT  2,091,047
ELECTRODE ASSEMBLY
Filed Aug. 21, 1936  2 Sheets-Sheet 1
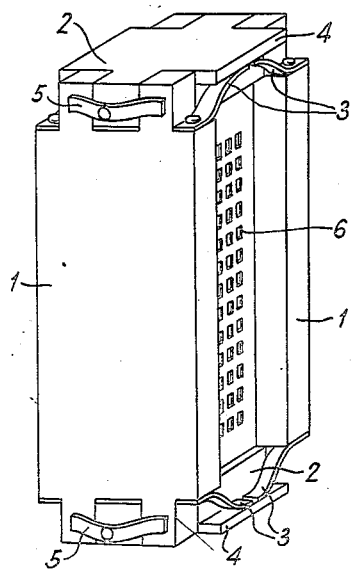
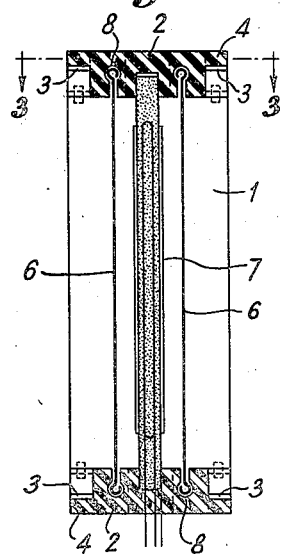
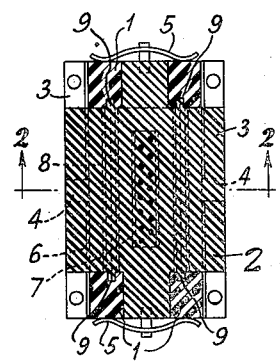
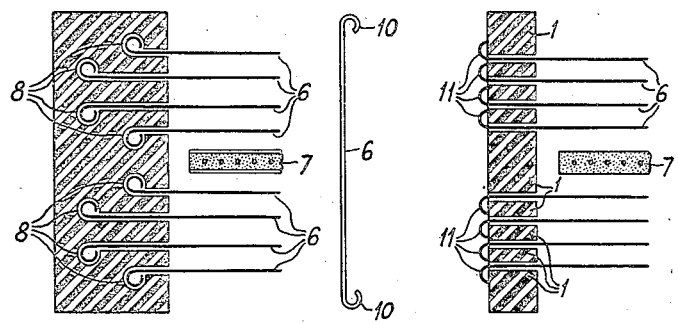
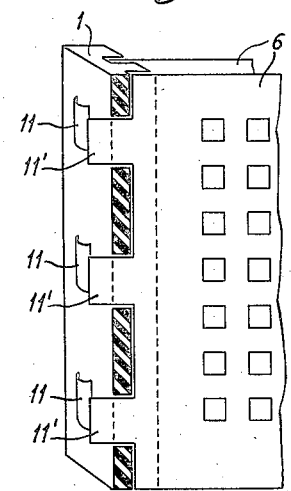
INVENTOR
ALFONS KAUFFELDT
BY
Charles McClair
ATTORNEY Aug. 24, 1937.                A. KAUFFELDT                2,091,047
                            ELECTRODE ASSEMBLY
                         Filed Aug. 21, 1936            2 Sheets-Sheet 2

INVENTOR
ALFONS KAUFFELDT
BY
Charles McClain
ATTORNEY

Patented Aug. 24, 1937

2,091,047

UNITED STATES PATENT OFFICE 2,091,047

ELECTRODE ASSEMBLY

Alfons Kauffeldt, Berlin, Germany, assignor to Telefunken Gesellschaft fur Drahtlose Telegraphie m. b. H., Berlin, Germany, a corporation of Germany Application August 21, 1936, Serial No. 97,129
In Germany October 15, 1935

10 Claims. (Cl. 250—27.5)

The customary cylindrical form of the electrode assembly for discharge tubes possesses certain outstanding merits but involves a number of fundamental drawbacks. In the cylindrical structure, for instance, an increase of the areas of active portions of the electrodes requires a considerable increase in the overall size of the tube, which is particularly true of the cathode. Side rods and brace members for the various electrodes which are unnecessary for the discharge proper are troublesome since they must be mounted in the path of the discharge, unless more complicated forms of construction are resorted to. The cylindrical construction is particularly unsuited for tubes in which extremely small inter-electrode spacing must be maintained with a high degree of accuracy, even in large-scale production.

In addition to alterations of the spacing between cylindrical electrodes there may be departures from the cross-sectional shape of the electrodes and movement from exact centering.

The object of this invention is to create an electrode structure which will obviate all the drawbacks inherent in the old types and which is easy to manufacture.

All parts and connections that are important in insuring definite inter-electrode spacing are so chosen and shaped that they may be manufactured in automatically operated machines, so that all that is required of the operator is to assemble the constituent parts of the electrode mounting.

According to this invention a rectangular frame of insulation material is provided into which flat rectangular electrodes are fitted. The frame itself consists of two side pieces and two end pieces assembled in such a way that the end and side pieces will have a certain amount of mobility so that spring means may spread them apart. The flat electrodes are attached at their edges to these pairs of lateral pieces, with their planes parallel to the plane of the square so that the electrodes are put under tension by action of the springs which tend to spread the pieces apart.

The electrodes are made of materials sufficiently elastic that each electrode is tensioned by the spring biased pieces.

In one pair of lateral members are guides or key-ways for the electrodes in the form of grooves or slots so that the planar or rectangular electrodes are retained in a frame, while being at the same time subject to pull in one direction, so that with thin and inherently non-rigid electrodes there is a tendency to preserve dimensions. The whole electrode assembly may follow variations in length caused by changes in temperature without altering its physical quantities or characteristics, since all movements take place parallel to the plane of the electrodes and do not alter the inter-electrode spacing.

Which pair of lateral members is to accommodate the electrode will depend upon circumstances. If the frame consists of a rectangle with one pair of long sides and a pair of shorter sides, then the electrodes will preferably be supported by the shorter sides, while the tension or spring means will be suitably attached to the longer sides, because this makes it more effective to tension the electrodes in their longitudinal direction. It may, however, be desirable to support the electrodes with the longer sides and to insure tensioning with the shorter ones.

It is not necessary that the frame proper be made of insulation material. It may be found advantageous to make the frame of metal and to fit or embed in the frame pieces of insulation. The latter may then be made of a simpler shape and they may be made lighter seeing that they are no longer called upon to take up the spring forces which are to tension the frame.

When a metal frame is employed the frame members may be so formed that they will afford a shielding action. By additional metal shields complete screening of the entire electrode assembly is feasible. The frame renders the electrode mounting a self-supporting unit which may be separately manufactured, and mounted in an evacuated envelope of glass, metal, or ceramic material.

The basic idea of the invention is explained in more detail in the following specification and the annexed drawings. The drawings are in schematic form in order that the essential features of the scheme may be illustrated most clearly. The dimensions and proportions of the illustrations are only representative, it being left to the discretion of the man skilled in the art to choose the most suitable dimensions and thicknesses of the parts. One reference numeral throughout the drawings stands for one and the same element of like function.

Figure 1 is a perspective representation of one embodiment of the invention. The long side pieces 1 are fitted together with the short side pieces 2 to make a rectangular frame. Springs 3 which are fastened by welding or otherwise upon set-off portions of the longitudinal sides 1 exert pressure against the projecting lugs 4 of the short sides 2 so that they bias these pieces apart. Spring clips 5 hold the frame together in the opposite direction. Between the lateral pieces 2 are suspended electrodes 6 as can be clearly seen from Figure 2, and they are longitudinally tensioned by the agency of springs 3. It will be noted from Figure 2 that electrodes 6 are rolled up at their ends and that they are fitted into slots 8 having a cross-section resembling a Q. Two other slots of rectangular cross-sectional shape support indirectly heated cathode 7. Figure 3 illustrates a cross-section laid through a lateral piece 2 taken at right angles to the plane of electrodes 6. It will be seen that long sides 1 have guide slots or keyways 9 for the projecting electrodes so that they are held and guided with a minimum of clearance or play.

Figures 4a and 4b show means for simultaneously tensioning all electrodes. Figure 4b shows the edges of the electrodes circularly rolled up, while Figure 4a shows that the electrodes come to bear at the free end of the circle or rolled portion upon insulation member 1. If, then, the two lateral pieces 1 are spread apart by the springs, the electrodes will somewhat yield to this spring pull. The purpose of this arrangement is to compensate for slight discrepancies in length between different electrodes. It will be sufficient to this end to make the spring action so strong that some of the electrodes which may have turned out to be too short will be stretched. At any rate, it is thus possible to impart to all of the electrodes a predetermined minimum of tension.

Figure 4a also shows an arrangement for slots 8 designed to accommodate the ends of the electrodes which makes it feasible to retain and hold the various electrodes very close together without overloading the insulation material.

In the modification shown in Figure 5 the rectangular electrodes 6 have ears 11' (Figure 6) which extend through slots in side piece 1. The protruding ears, as can be seen from Figure 7, are semi-circularly bent over into the form shown at 11.

Figure 8:
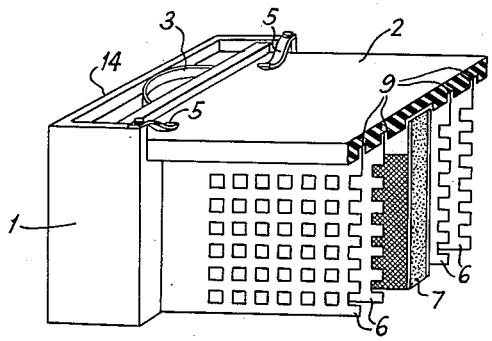
Figure 9:
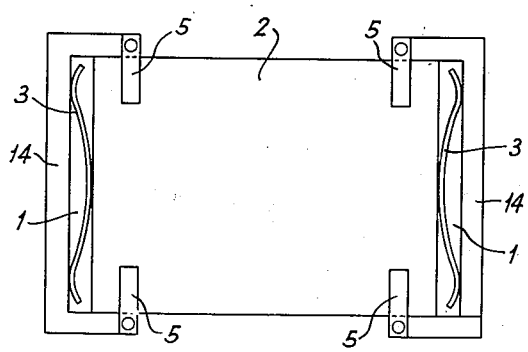

Figure 8 is a perspective view of a section of another device constructed in accordance with this invention. It will be seen that electrodes 6 and cathode 7 are held and guided in grooves or slots 9 in the side pieces. The side and end pieces 1 and 2 are assembled and fitted together so that spring 3 exerts pressure against a strip 14 of the long side 1 supporting the electrodes, and the clip or clamps 5 may be attached as shown in Figure 8, or they may take the form shown in Figure 9.

Figure 10:
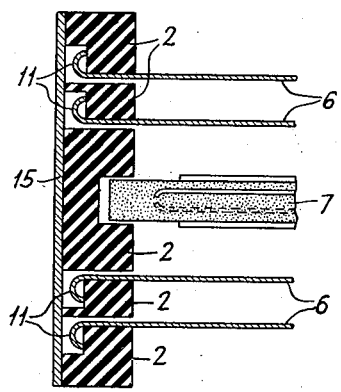
Figure 11:
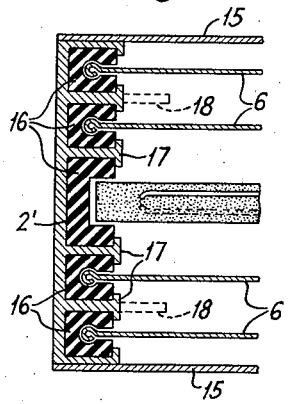
Figure 12:
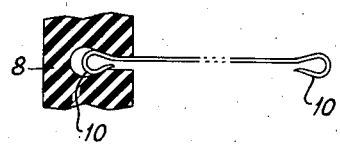

It is desirable to shield the electrode ends 11 from one another, as illustrated in Figure 10. In this case, ends 11 are fitted into suitable slots of insulation body 2, and are screened from each other by metallic plate 15. Effective shielding may be had by making the whole frame of metal as shown in Figure 11. Metal frame 2' has T-shaped strips 17, and, if desired, the latter may have extensions 18 which are shown dotted in Figure 11. In the grooves between the T-pieces are fitted the insulation bodies 16 which, in turn, accommodate electrodes 6 and cathode 7. The slabs of metal 15 are attached at their edges to side piece 2' so that they completely enclose the electrode system. In this arrangement it is of advantage to make the rolled ends of the electrodes drop or pear-shaped in cross-section, as shown in Figure 12, and by making slot 8 of conical form the electrodes are more yieldable and are afforded a greater degree of mobility.

It will be obvious that many modifications may be made without departing from the scope of the invention here shown and described. The assembling of the side members of the frame as well as the means to insure elastic yielding of the electrodes together with the spring tensioning of the frame may be accomplished in ways different from those shown. The electrode leads have been omitted in the drawings, but they may be brought out in any desired manner, preferably at the bottom part of the frame. If the electrodes are placed in a horizontal position, small strips could be provided for the ends of slots 8 against which the electrodes may bear.

Slots 8 may be formed by drilling and milling to insure trueness of dimensions for the longitudinal slots which would insure accurate electrode spacing.

The invention will be found useful for all kinds and types of tubes. For instance, Figures 1 to 3 show a full-wave rectifier tube, Figures 4 and 5 show pentodes and Figures 8, 10 and 11 triodes. Because of the similarity of the electrodes in the several types of tubes, the electrode may be economically manufactured in quantities.

The electrode mounting here disclosed is especially suited for gas discharge tubes. Frequently it is desirable to mount large-surfaced electrodes opposite each other at a distance which is shorter than the mean-free-path of an electron in the gas, and to maintain this distance throughout the life of the tube. One outstanding advantage is that the edges of the electrodes may be entirely shielded from each other.

The electrodes themselves may be made of sheet metal or wire gauze. In case sheet metal is used, it is advisable to provide openings in the metal so that heat given off from the cathode may be readily radiated and carried away.

I claim:

1. An electrode assembly comprising a planar, rectangular electrode, a rectangular frame comprising rigid side and end pieces, two of said pieces being attached to opposite edges of said electrode and spring biasing means to spread said two pieces and tension said electrode.

2. An electrode assembly according to claim 1 with this characteristic feature that the frame pieces are fitted together at the corners and locked by clamps.

3. An electrode assembly according to claim 1, with this characteristic feature that the pair of frame pieces attached to the electrode is furnished with projecting strips against which springs attached to the other pair of frame pieces come to press.

4. An electrode assembly comprising a plurality of parallel planar electrodes, a rectangular supporting frame comprising two end pieces and two side pieces with their ends slidably joined at the corners of said frame, means for yieldably attaching opposite edges of said electrodes to opposite pieces, and spring means for spreading said opposite pieces to tension all of said electrodes.

5. An electrode assembly according to claim 4, with this characteristic feature that the opposite edges of the electrodes are rolled to form circular cylinders which are fitted into slots in the frame pieces.

6. An electrode assembly according to claim 4, with this characteristic feature that the yieldable attaching means comprises ears on the edges of the electrodes that extend through slots in said pieces, the ears being rolled and their ends pressed against the outer surface of said pieces.

7. An electrode assembly according to claim 4, with this characteristic feature that the opposite edges of the electrodes are so rolled over that the cross-section of the edges of the electrodes are drop-shaped, and slots of corresponding cross-section in said frame pieces to receive said edges of the electrodes.

8. An electrode assembly according to claim 4 with this characteristic feature that the edges of the electrodes are formed with ears which are inserted in said pieces, the ears of adjacent electrodes being staggered along said pieces.

9. An electrode assembly according to claim 1, with this characteristic feature that the frame pieces are of metal in which are held pieces of insulation to which the electrodes are attached.

10. Electrode mounting according to claim 4, with this characteristic feature that the frame pieces are fitted with shielding strips which extend from the pieces in the space between the electrodes.

ALFONS KAUFFELDT.